UNITED STATES PATENT OFFICE

ALTON J. BLANK, OF PUEBLA, MEXICO, ASSIGNOR TO CEMENT PROCESS CORPORATION, A CORPORATION OF DELAWARE

MANUFACTURE OF CEMENTITIOUS MATERIALS

No Drawing.   Application filed November 23, 1932. Serial No. 644,084.

This invention relates to the manufacture of cementitious materials, and more particularly to a new process whereby such materials may be produced at a relatively low cost as compared with the present processes and with strength and other physical properties adjusted as desired in order to meet any one of a wide variety of industrial applications. The invention also includes the new cementitious products that may be produced by the process.

The processes heretofore commonly employed for preparing hydraulic cements of the types known as Portland cement and super cement have included as an essential step the calcination to incipient fusion of an intimate and properly proportioned mixture of calcareous and argillaceous materials. This operation involves a large initial outlay for kilns and related apparatus and a continuing relatively high cost for repairs and maintenance of the apparatus employed. In addition, there are substantial operating costs for fuel and power. The product of the calcination treatment must be re-ground, thus further adding to the cost of manufacture.

The calcination treatment above mentioned has been regarded as essential in order to bring about such chemical combinations between the lime constituent and the siliceous and aluminous components of the argillaceous material as will insure to the product the hydrating, strength and setting properties desired in a hydraulic cement of either of the types above mentioned. As disclosed in my co-pending application Serial No. 623,598, filed July 20, 1932, of which this application is in part a continuation, I have discovered that when lime in a form reactive to silica and alumina and in a fine state of subdivision is brought into intimate contact with finely divided siliceous material, or with an argillaceous material or any one of the types heretofore considered as useful in Portland cement manufacture, under controlled low temperature conditions and in the presence of water or water vapor, the lime will enter into chemical combination with the siliceous components as well as the aluminous components of the argillaceous material. Depending on the duration of the treatment, the temperature and the kinds and proportions of the calcareous and siliceous or argillaceous materials used, the resulting product may be on the one hand similar in composition and have physical properties equal to those possessed by the best grades of Portland cement, and in some cases equalling or exceeding those possessed by the so-called super cements and other high-grade hydraulic cements now available. On the other hand, a product having properties which make it particularly adaptable for use as a mortar or as a relatively low-grade cement may be produced.

I have found further that the addition of varying amounts of Portland cement or Portland cement clinker and the grinding or mixing of the same with the calcareous and siliceous, or argillaceous materials of the types above mentioned, under the controlled low temperature and moisture conditions above mentioned effects a marked enhancement in the strength properties and other desirable physical characteristics of the cementitious products produced.

I have still further found that when certain so-called catalyzing and accelerating agents are added at an appropriate stage in the process there is a further marked improvement in the properties of the finished product.

More particularly, I have found that by using properly selected calcareous and siliceous materials, or argillaceous materials of the types above mentioned, and suitably regulating the temperature and moisture conditions during the reaction stage the silica component and the alumina component if present, of the siliceous or argillaceous material can be either partially or completely brought into chemical combination with the lime component, thereby forming a resulting product with controlled physical and chemical properties. The reaction of the lime and the siliceous and aluminous components appears to take place when the lime, if introduced as quick lime, has been brought to the hydrated state and to be accompanied by the liberation of water. When conditions are so controlled as to substantially completely react the siliceous and aluminous components with lime, the resulting product will ordinarily contain only an extremely small proportion of free water, usually less than 1%, and only a minor proportion of the combined water originally present in the siliceous or argillaceous material used and in the calcareous material, if this material is introduced in the form of lime hydrate. The presence during the reaction stage of free water either as such or in the form of steam appears to be essential to bring about the desired combinations between the lime and the silica and alumina. On the other hand, for the production of a satisfactory product, it is not essential that the reactions be carried to the point where the greater part of the combined water originally present shall have been removed.

I have found that, in the presence of a limited amount of water, water vapor or steam, lime, whether introduced as quick lime or as the hydrate, can be caused to react with the siliceous components of a siliceous material, or the siliceous and aluminous components of an argillaceous material, over a relatively wide temperature range. The reaction at temperatures below the boiling point of water is relatively slow and incomplete but may be increased to some extent by resort to extremely fine grinding and vigorous stirring of the materials during the treatment. At higher temperatures the reactions proceed more rapidly and at temperatures of from about 120° C. and upwards the desired combinations may be effected in a relatively short time. Ordinarily, in order to insure that the water, which may be initially present either in combined or free form in the materials used or may be added during the course of the operation, is not removed so rapidly as to be ineffective in aiding in promoting the desired reactions, the operating temperatures should not be carried to above say around 400° C. The temperature values above indicated are to be understood as meaning the temperature of the exciting product taken as it leaves the tube mill or other grinding or mixing apparatus used for effecting the desired reactions. The temperature in the reaction zones will be somewhat higher.

While any of the siliceous material or argillaceous materials commonly used in cement manufacture may be employed, I have found that particularly advantageous results have been obtained with materials that in their natural state or after a small amount of grinding, are reduced to a fine state of subdivision. Materials possessing this physical characteristic are tripoli and diatomaceous earth. These materials reduce easily to a fineness of at least 90% through a 200-mesh screen. When other siliceous materials, such for example as sand, or materials of an argillaceous nature, are to be used, they should be ground, either preliminarily or in the course of the process, more finely than has been the general practice when they are used in making Portland cement according to the high temperature process.

I am aware of the fact that it has been proposed heretofore to bring about chemical combinations between lime and alumina by slaking quick lime in the presence of certain highly aluminous clays. However, in this prior art care was taken to avoid the use of materials containing large amounts of silica. By contrast my process has for an object to bring about combinations between the lime and the siliceous components of the siliceous clay or other siliceous material employed whereby a product possessing the setting and strength characteristics of materials containing calcium silicates is obtained.

My experience confirms the opinion prevailing in the art, that alumina reacts relatively easily with lime to form quick setting compounds, whereas silica is relatively inert, but when brought into combinations with lime produces compounds which on setting exhibit high strength. My investigation show that silica as existing in naturally occurring clays or siliceous materials either does not react with lime when mixed therewith at ordinary room temperatures or reacts so slowly as to make it impracticable to attempt to produce compounds having satisfactory setting properties and strength by merely mixing the materials at ordinary temperatures. It was only after extended investigations that I was led to the discovery that silica is reactive with lime to a satisfactory degree when brought into intimate relation therewith at moderately elevated temperatures provided such contact is effected in the presence of moisture and under appropriate conditions as to intermingling and sub-division of the respective components. I am also aware of the fact that it has been proposed to increase the reactivity of silica toward lime by subjecting siliceous materials to a preliminary calcination treatment. However, I have established by careful investigation that even with such preliminary calcination treatment, silica does not react with lime at low temperatures sufficiently rapidly or to such an extent as to produce a product having the setting properties and strength characteristic of cements containing calcium silicates, and that even at moderately elevated temperatures, say of the order of around 100 to 400° C., no practical result is obtainable unless the materials are suitably comminuted, either preliminarily or in the course of the operation, and sufficient water is supplied to insure the presence of moisture in the reaction zone throughout the course of the operation.

The practice of the invention will be illustrated by the following examples:

Caustic lime and diatomaceous earth in the proportions by weight of two parts of lime to one part diatomaceous earth calculated on a dry basis were introduced into a tube mill and subjected to a grinding and mixing action in accordance with normal grinding practice. The diatomaceous earth contained about 40% of its dry weight of free water. Sufficient additional water was added to insure complete hydration of the lime and to insure that the grinding was carried out continuously in the presence of moisture, but at the same time did not produce wet grinding conditions. The temperature of the materials introduced was approximately 22° C. The operating conditions were so controlled that the temperature of the product existing at the discharge end of the mill was approximately 150° C. This control was effected by regulating the feed rate of the charge materials. Varying amounts of Portland cement were admixed with the materials in the tube mill and samples of the resulting product obtained and tested. Sample products containing no Portland cement were also obtained and tested. I set forth below the tensile strength values and setting times of the several products together with percentage comparisons of the same with a representative high-grade Portland cement composition:

| Percent cement in test sample | Tensile strength values in lbs. per sq. inch (1:3 sand) | | | | Comparison in percent with Portland cement | Setting time (hours and minutes) | |
|---|---|---|---|---|---|---|---|
| | 24 Hrs. | 3 Days | 7 Days | 28 Days | | Initial | Final |
| 100 | 235 | 341 | 406 | 462 | 100 | 2:00 | 4:20 |
| 42.6 | 326 | 376 | 449 | 527 | 116.2 | 0:15 | 1:00 |
| 7.1 | 61 | 108 | 261 | 475 | 62.7 | 3:10 | 7:30 |
| 0.0 | 47 | 40 | 91 | 337 | 35.7 | 6:20 | 16:20 |

It will be observed from the above that the product containing 42.6% of Portland cement shows strength values approximately 16% greater than a representative high-grade Portland cement and, therefore, of the order of a super cement. Still higher percentages of Portland cement additions up to around 50% and even more, if desired, are recommended where still higher early strengths are required. The product containing no Portland cement addition possessed the physical properties and other characteristics adapting it for use either as a mortar or as a high quality plaster. With additions of Portland cement of around 5 to 10% a high-grade mortar can be produced.

In another test run caustic lime and tripoli in the proportions by weight of two parts of lime to one part of tripoli were mixed with water in a hydrator consisting of a long screw conveyor and to which the materials and water were added at one end and from which the hydrated lime and tripoli mix was introduced directly into a tube mill while heated as a result of the hydrating reactions. An excess of water was added in the hydrator sufficient to insure the presence of moisture in the materials discharged into the tube mill. The operating conditions in the tube mill were controlled similarly as in the preceding example, and varying amounts of Portland cement were mixed with the materials in the tube mill and samples of the resulting products obtained and tested. I set forth the tensile strength values and setting times of the several products together with percentage comparisons of the same with a high-grade Portland cement:

| Percent cement in test sample | Tensile strength values in lbs. per sq. inch (1:3 sand) | | | | Comparison in percent with Portland cement | Setting time (hours and minutes) | |
|---|---|---|---|---|---|---|---|
| | 24 Hrs. | 3 Days | 7 Days | 28 Days | | Initial | Final |
| 100 | 235 | 341 | 406 | 462 | 100 | 2:00 | 4:20 |
| 91.4 | 256 | 390 | 487 | 520 | 114.4 | 1:50 | 5:20 |
| 72.6 | 291 | 445 | 467 | 559 | 122.5 | 1:50 | 4:50 |
| 64.6 | 197 | 345 | 424 | -------- | 98.4 | 2:20 | 5:45 |
| 50.0 | 174 | 246 | 302 | -------- | 73.5 | 1:50 | 5:00 |
| 36.1 | 127 | 158 | 220 | -------- | 51.4 | 2:20 | 6:50 |

The results of these tests go to show that in practising this embodiment of the invention and with the siliceous material indicated very satisfactory mortars and stuccos may be produced by adding from 10 to 20% of Portland cement in the course of the operation; that with additions of Portland cement of, say 65%, a product having early strength and other desired properties equal to those of a high-grade Portland cement may be produced; and that when the Portland cement addition constitutes 70 to 90% of the final product, such product will have the characteristics of a super cement.

Instead of mixing the siliceous material with the lime prior to the hydrating step as in the next preceding example, I may hydrate the lime separately and then add the siliceous material to the hydrated lime in the tube mill. Tests that have been made with diatomaceous earth and with tripoli show that the results obtainable by operating in this manner, both with and without the further addition of varying amounts of Portland cement, are equally as good and in some instances better than those so far obtained by practising the invention in the ways hereinbefore described. When the hydration is carried out in a separate step from the final mixing and grinding in the tube mill, it is preferable to pass the hydrated material directly to the tube mill without permitting it to cool, thus conserving the heat of hydration and thereby helping to maintain the optimum temperature conditions for promoting the desired reactions in the grinding and mixing stage in the tube mill. Similar modifications may be made when using any of the argillaceous materials hereinbefore mentioned.

In another test air slaked lime, tripoli and water were mixed in the screw conveyor hydrator and then treated in the tube mill. Sufficient water was added to insure the presence of moisture throughout the grinding operation in the tube mill, but insufficient water was added to produce wet grinding conditions. The temperature of the tube mill operation was so controlled as to insure a temperature in the exiting material of approximately 150° C. The lime used in this test had been burned in a vertical kiln and contained a high percentage of the sulphate and the sulphide of lime, whereas the lime used in earlier tests had been burned in a rotary kiln and contained only a trace of these constituents. The results of this test were in some ways still more interesting than those of the previous tests. Based on test strength data up to and including 7-day strength figures, the product produced both without Portland cement additions and with varying cement additions showed the following percentage values as compared with the Portland cement used as a basis of comparison in the tests hereinbefore set forth in greater detail:

| Percent cement in test sample | Comparison in percent with Portland cement |
|---|---|
| 92.2 | 131.0 |
| 42.60 | 127.0 |
| 22.20 | 88.0 |
| 0.00 | 41.7 |

The results of this test indicate that an addition of around 30% of Portland cement would insure a finished product giving the normal strength values for Portland cement. With larger additions a product having the high early strengths of a super cement may be produced. The superior strength values of the products of this test as compared with those hereinbefore mentioned for a lime-tripoli mix are believed to be in part due to the presence of calcium carbonate that had been formed in the lime in the air-slaking period, and in part to the presence of sulphur either as sulphate or sulphide, in the lime, and to beneficiating effects produced by these compounds in the course of the grinding and mixing operations of the process.

In addition to the tests above described, other tests have been conducted with clay and with river sand which indicate that the process is not limited in its application to specially selected relatively high-grade types of siliceous materials such as diatomite and tripoli. In the tests so far conducted with clay it has been found that a good grade of mortar may be produced when small additions of Portland cement have been made. In order to produce a product having the desired physical properties of Portland cement, an addition of approximately 50% of Portland cement to the other materials treated in the process is recommended, and for the production of a super cement of good quality a 75% addition of Portland cement would be needed.

Mixtures of diatomaceous earth, tripoli and clay, and mixtures of diatomaceous earth and tripoli, have also been used as the siliceous or silico-argillaceous material constituent with satisfactory results. As hereinbefore more generally indicated, our tests have shown that the process is capable of application to a wide variety of argillaceous materials.

As previously stated herein, I have found that the use of certain accelerating or improving agents appears to effect a marked increase in the strengths obtained and in speeding up of the setting of the product. Agents of this type that I have found to improve the siliceous or silico-products of this process are ordinary salt, calcium chloride, sodium hydroxide and tannic acid. I am aware of the fact that others have used these agents and other agents that may be regarded as equivalent thereto for effecting certain improvements in the setting and strength properties of cementitious materials. However, the results obtained by me in my investigations go to show that such agents produce in the products of my process a much greater degree of enhancement of desired physical properties than might have been predicted from their effect on the cementitious materials with which they have heretofore been used. I believe that this is due at least in part to the fact that these agents are introduced into my product at a different stage in its manufacture and under conditions radically different from those under which they have been used by the prior workers. The addition of these agents to my product is being made the subject of a co-pending application Serial No. 644,083, filed Nov. 23, 1932, wherein I am setting forth examples of specific tests.

In addition to the products with properties of the order of those of Portland cement and super cements, products having plasticity and spreading qualities adapting them for use as high-grade mortars and plasters may be produced. In this connection, it has been observed that the products produced either without any Portland cement addition or with small additions, say, less than 10%, show strikingly high increases in strength in the period from 7 to 28 days. In other words, the mortars possessing either low or normal strengths at the end of 7 days show strengths at the end of 28 days far superior to those possessed by the mortars now commonly available and having similar strength properties at the end of 7 days.

In further explanation of the strength values and the setting times observed and set forth in the tables hereinbefore presented, I would point out that the tests there recorded were all carried out in accordance with American standard methods for testing Portland cement. This involved, for the strength tests, holding the test samples in air for 24 hours and then immersion in water for the other periods. It will be understood that this method would not be productive of such high strength values for the mortar compositions as would have been the case if such samples had been tested under the standard conditions laid down for testing mortars. For the purpose of better evaluating the test products that showed promise as mortars rather than cements, a series of strength tests was run wherein the test samples were stored for one day in the air and then for 3, 7, and, in some cases, 28 days in moist air, i. e., they were disposed in a closet above a pan of water so as to insure humid conditions. These tests were uniform in showing markedly higher strength values than were recorded in the tests made according to the Portland cement testing method.

In the test runs referred to herein, the tube mill employed was of standard type having an internal diameter of 5 feet and a length of 22 feet, and provided with grinding media consisting of cylindrical metal slugs of about 5/8" diameter and 1½" in length. It will be understood that other forms of grinding and mixing apparatus may be employed which will insure a similar degree of grinding and mixing.

It will be understood that the tube mill operations referred to above are cited merely by way of example. There are obviously many other methods and means for effecting the desired intimate mixture of calcareous and siliceous or argillaceous materials in the presence of moisture and with controlled temperature conditions. In lieu of a tube mill such as described, other types of grinding mills and agitating and mixing devices may be used provided steps are taken to insure the presence of moisture and control of the temperature in the operation within a range promoting the desired reactions.

When the tube mill or another grinding mill is employed some grinding takes place along with the mixing of the materials. However, grinding is not essential provided the materials have been reduced to a sufficient degree of fineness before they are mixed. Therefore, agitating and mixing apparatus that will insure a thorough and rapid mixing of the materials may be substituted for the grinding mill in case the materials are brought to the operation in a state of fine subdivision.

The degree of fineness to which the materials should be brought either before or during the mixing operation will vary to some extent with the materials and with the type of cement that it is ultimately desired to produce. When producing a product having a high strength and quick hardening properties superior to those possessed by ordinary Portland cement or similar to or even exceeding those of the super cements now available, materials should be used that have a relatively high degree of fineness. This condition is satisfied when either diatomaceous earth or tripoli is used. The former material easily reduces to a fineness of about 95% through a 325-mesh sieve. Likewise, tripoli is easily reduced to a fineness of about 95% through a 200-mesh sieve and 70% through a 325-mesh sieve. These finenesses were possessed by the diatomaceous earth and tripoli used in the tests hereinbefore described. If other siliceous materials or argillaceous materials are used for the purpose of producing products having superior properties of the kind above mentioned they should be brought to a degree of fineness of the order specified. In producing products of given strength values, the proportion of Portland cement addition may be reduced by using Portland cement that has been more finely ground than is the customary practice.

In making the Portland cement addition, it is important to bear in mind that such addition when made in the form of finely ground cement must be made at a point subsequent to the hydrating step if a product having the setting or other properties of a Portland or super cement is to be obtained. Otherwise the setting properties of the product will be destroyed in the hydrating stage. If the hydration of the lime is to be carried out in the tube mill simultaneously with the grinding and mixing incident to the reaction of the lime with the siliceous, or siliceous and aluminous, components present, it is preferable to make the Portland cement addition in the form of clinker or coarsely ground cement, say, clinker screened to minus ⅛" mesh.

In addition to the desirable properties possessed by my product, that have been heretofore mentioned, I would further point out that a product may be produced that is characterized by a higher degree of plasticity than is possessed by Portland cement and having as a consequence good water-proof properties even without the addition of any substance designed to impart water-proofing properties.

It is also within the scope of the invention to add a suitable water-proofing agent at an intermediate stage in the operation, as for example in the hydrator or in the tube mill. Tests have shown that rosin up to approximately 2% by weight of the final product is effective in imparting water-proofing properties. Other resins or organic materials capable of forming resinates with the lime component of the mixture may be used.

A further characteristic of this type of product when it is prepared by the use of a siliceous material such as one of the infusorial earths, e. g., diatomaceous earth or tripoli, is its relatively low specific gravity. Cement products may be produced by the use of diatomaceous earth with a specific gravity of around 2.3. Products may be produced by the use of tripoli with a specific gravity of around 2.6. These figures compare with the specific gravity of ordinary Portland cement of around 3.1 and consequently point to another advantage of my product in situations where high strength with reduction of weight is a consideration.

My process has the further advantage that it makes possible the production of products of different color shades up to and including white by properly selecting the materials used.

The term "water" as used in the claims is to be understood as including not only water per se but also water vapor and steam.

It will be understood that various modifications may be made in the details of the procedure and in the proportions and kinds of materials employed without departing from the spirit of the invention which is not to be deemed as limited other than as indicated in the appended claims.

I claim:

1. The process of producing a cementitious product which comprises mixing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, said mixing being carried on in the presence of an amount of water sufficient to insure hydration of any quick lime present and sufficient to insure the presence of free moisture in the mixture throughout the mixing operation, and, while mixing, maintaining the mixture at a temperature of about 100° C. or more to produce mutual reactions between the lime and the siliceous components of said material.

2. The process of producing a cementitious product which comprises mixing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, said mixing being carried on in the presence of an amount of water sufficient to insure hydration of any quick lime present and sufficient to insure the presence of free moisture in the mixture throughout the mixing operation, and, while mixing, maintaining the mixture at a temperature of at least 100° C. to produce mutual reactions between the lime and the siliceous components of said material.

3. The process of producing a cementitious product which comprises grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of a limited amount of water while maintaining the mixture at a temperature of about 100° C. or more to produce mutual reactions between the lime and the siliceous components of said material, and continuing said treatment until the mixture has been reduced to a state of subdivision of approximately 90% through a 200-mesh screen or finer.

4. The process of producing a cementitious product which comprises grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of a limited amount of water while maintaining the mixture at a temperature of at least 100° C. and not exceeding about 400° C., as measured by the temperature of the product exiting from the grinding zone, to produce mutual reactions between the lime and the siliceous components of said material, and continuing said treatment until the mixture has been reduced to a state of subdivision of approximately 90% through a 200-mesh screen or finer.

5. The process of producing a hydraulic cement which comprises grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of a limited amount of water while maintaining the mixture at a temperature sufficient to produce mutual reactions between the lime and the siliceous components of said material, and continuing said treatment until the mixture has been reduced to a state of subdivision exceeding approximately 90% through a 200-mesh screen or finer, and until the lime and the siliceous components, and as well, any aluminous components present, have been brought into chemical combinations such that the product will show the hydrating and setting properties characteristic of a hydraulic cement.

6. The process of producing a hydraulic cement which comprises grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of a limited amount of water while maintaining the mixture at a temperature of at least 100° C. and not exceeding about 400° C., as measured by the temperature of the product exiting from the grinding zone, to produce mutual reactions between the lime and the siliceous components of said material, and continuing said treatment until the mixture has been reduced to a state of subdivision exceeding approximately 90% through a 200-mesh screen or finer, and until the lime and the siliceous components, and as well, any aluminous components present, have been brought into chemical combinations such that the product will show the hydrating and setting properties characteristic of a hydraulic cement.

7. The process of producing a cementitious product which comprises bringing together and intimately mixing finely divided caustic lime with a finely divided material selected from the group consisting of silica sands, siliceous earths and clays, and other argillaceous and argillo-calcareous materials generally known to be suitable as the raw materials for supplying the siliceous and aluminous components in Portland cement manufacture, while supplying moisture in sufficient quantity to hydrate the lime and keep the mixture in a moist condition and maintaining the mixture at a temperature sufficient to produce mutual reactions between the lime and the siliceous components of said material.

8. The process of producing hydraulic cement which comprises mixing caustic lime with a material selected from the group consisting of silica sands, siliceous earths and clays, and other argillaceous and argillo-calcareous materials generally known to be suitable as the raw materials for supply the siliceous and aluminous components in Portland cement manufacture, and previously reduced to a fineness of approximately 90% through a 200-mesh screen or finer, in the presence of water to effect hydration of the lime, and continuing the mixing in the presence of an amount of water sufficient to insure the presence of free moisture throughout the mixing operation, and, while mixing, maintaining the mixture at a temperature of about 100° C. or more to produce mutual reactions between the lime and the siliceous components of said material until the lime and the siliceous components, and as well, any aluminous components present, have been brought into chemical combinations such that the product will show the hydrating and setting properties characteristic of a hydraulic cement.

9. The process of producing a cementitious product which comprises mixing caustic lime and a material selected from the group consisting of silica sands, siliceous earths and clays, and other argillaceous and argillo-calcareous materials generally known to be suitable as the raw materials for supplying the siliceous and aluminous components in Portland cement manufacture, in the presence of sufficient water to effect hydration of the lime, then grinding the resulting mixture in the presence of a limited amount of water while maintaining the mixture at a temperature sufficient to produce mutual reactions between the lime and the siliceous components of said material, and continuing said treatment until the mixture has been reduced to a state of subdivision of approximately 90% through a 200-mesh screen or finer.

10. The process of producing a cementitious product which comprises mixing hydrated lime and a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, in the presence of an amount of water sufficient to insure the presence of free moisture throughout the mixing operation, and, while mixing, maintaining the mixture at a temperature sufficient to produce mutual reactions between the lime and the siliceous components of said material.

11. The process of producing a cementitious product which comprises grinding air slaked lime and a material selected from the group consisting of silica sands, siliceous earths and clays, and other argillaceous and argillo-calcareous materials generally known to be suitable as the raw materials for supplying the siliceous and aluminous components in Portland cement manufacture, in the presence of water, while maintaining the mixture at a temperature of about 100° C. or more to produce mutual reactions between the lime and the siliceous components of said material, and continuing said treatment until the mixture has been reduced to a state of subdivision of approximately 90% through a 200-mesh screen or finer.

12. The process of producing a cementitious product which comprises forming a mixture of lime in a form reactive to silica and alumina and a material selected from the group consisting of silica sands, siliceous earths and clays, and other argillaceous and argillo-calcareous materials generally known to be suitable as the materials for supplying the siliceous and aluminous components in Portland cement manufacture, by mixing them in the presence of water and maintaining the mixture at a temperature of about 100° C. or more to produce mutual reactions between the lime and siliceous components of said material, and adding Portland cement thereto.

13. The process of producing a cementitious product which comprises mixing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and with Portland cement in the presence of water, and, while mixing, maintaining the mixture at a temperature sufficient to produce mutual reactions between the lime and the siliceous components of said material.

14. The process of producing a cementitious product which comprises mixing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, and with Portland cement in the presence of water, and, while mixing, maintaining the mixture at a temperature sufficient to produce mutual reactions between the lime and the siliceous components of said material.

15. The process of producing a cementitious product which comprises grinding lime in a form reactive to silica and alumina with a material selected from the group consisting of silica sands, siliceous earths and clays, and other argillaceous and argillo-calcarious materials generally known to be suitable as the raw materials for supplying the siliceous and aluminous components in Portland cement manufacture, and with Portland cement in the presence of water, while maintaining the mixture at a temperature sufficient to produce mutual reactions between the lime and the siliceous components of said material, and continuing said treatment until the mixture has been reduced to a state of subdivision of approximately 90% through a 200-mesh screen or finer.

16. The process of producing a hydraulic cement which comprises grinding a calcareous material containing lime in a form reactive to silica and alumina with a material selected from the group consisting of silica sands, siliceous earths and clays, and other sands, siliceous earths and clays, and other argillaceous and argillo-calcareous materials generally known to be suitable as the raw materials for supplying the siliceous and aluminous components in Portland cement manufacture, and with Portland cement in the presence of water, while maintaining the mixture at a temperature sufficient to produce mutual reactions between the lime and the siliceous components of said material, and continuing said treatment until the mixture has been reduced to a state of subdivision exceeding approximately 90% through a 200-mesh screen and until the lime and the siliceous components, and as well, any aluminous components present, have been brought into chemical combinations such that the product will show the hydrating and setting properties characteristic of a hydraulic cement.

17. The process of producing a cementitious product which comprises mixing caustic lime with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of sufficient water to effect hydration of the lime, and then mixing the resulting product with Portland cement in the presence of a limited amount of water, and while mixing maintaining the mixture at a temperature sufficient to produce mutual reactions between the lime and the siliceous components of the said material until the lime and the siliceous components, and as well, any aluminous components present, have been brought into chemical combination such that the product will show the hydrating and setting properties characteristic of a hydraulic cement.

18. The process of producing a cementitious product which comprises mixing caustic lime and a material selected from the group consisting of silica sands, siliceous earths and clays, and other argillaceous and argillo-calcareous materials generally known to be suitable as the raw materials for supplying the siliceous and aluminous components in Portland cement manufacture, with coarsely ground Portland cement in the presence of sufficient water to effect hydration of the lime, and then grinding the resulting mixture in the presence of water while maintaining the mixture at a temperature sufficient to produce mutual reactions between the lime and the siliceous components of said material.

19. The process of producing a cementitious product which comprises mixing caustic lime and a material selected from the group consisting of silica sands, siliceous earths and clays, and other argillaceous and argillo-calcareous materials generally known to be suitable as the raw materials for supplying the siliceous and aluminous components in Portland cement manufacture, in the presence of sufficient water to effect hydration of the lime, and then grinding the resulting mixture with Portland cement in the presence of water while maintaining the mixture at a temperature sufficient to produce mutual reactions between the lime and the siliceous components of said material.

20. The process of producing a cementitious product which comprises mixing hydrated lime and a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, with Portland cement in the presence of water, and, while mixing, maintaining the mixture at a temperature sufficient to produce mutual reactions between the lime and the siliceous components of said material.

21. The process of producing a cementitious product which comprises grinding air slaked lime and a material selected from the group consisting of silica sands, siliceous earths and clays, and other argillaceous and argillo-calcareous materials generally known to be suitable as the raw materials for supplying the siliceous and aluminous components in Portland cement manufacture, with Portland cement in the presence of water, while maintaining the mixture at a temperature sufficient to produce mutual reactions between the lime and the siliceous components of said material.

22. An improved cementitious product produced by grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of water, while maintaining the mixture at a temperature sufficient to produce mutual reactions between the lime and the siliceous and aluminous components of said material, and continuing said treatment until the mixture has been reduced to a state of subdivision of approximately 90% through a 200-mesh screen or finer.

23. An improved cementitious product produced by grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and with Portland cement in the presence of water, while maintaining the mixture at a temperature sufficient to produce mutual reactions between the lime and the siliceous and aluminous components of said material, and continuing said treatment until the mixture has been reduced to a state of subdivision of approximately 90% through a 200-mesh screen or finer.

24. A hydraulic cement product having the setting characteristics of a Portland cement and early strength properties exceeding those of Portland cement, the said cement product consisting of an intimate admixture of from 30 to 90% Portland cement with the balance principally a product produced by grinding lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, in the presence of water, while maintaining the mixture at a temperature of about 100° C. or more to produce mutual reactions between the lime and the siliceous and aluminous components of said material, and continuing said treatment until the mixture has been reduced to a state of sub-division of approximately 90% through a 200-mesh screen or finer.

25. The process of producing a cementitious product which comprises mixing lime in a form reactive to silica and alumina with a siliceous earth previously reduced to a fineness of approximately 90% through a 200-mesh screen or finer in the presence of an amount of water sufficient to insure hydration of any quick lime present and sufficient to insure the presence of free moisture throughout the mixing operation, and, while mixing, maintaining the mixture at a temperature of at least 100° C., and thereby effecting chemical combinations between the lime and silica components of the mixture.

26. The process of producing a cementitious product which comprises grinding lime in a form reactive to silica and alumina with diatomaceous earth in the presence of a limited amount of water while maintaining a temperature of at least 100° C., and thereby effecting chemical combinations between the lime and the siliceous components of the mixture.

27. The process of producing a cementitious product which comprises grinding lime in a form reactive to silica and alumina with tripoli in the presence of a limited amount of water while maintaining a temperature of at least 100° C., and thereby effecting chemical combinations between the lime and the siliceous components of the mixture.

28. The process of producing a cementitious product which comprises mixing caustic lime and a siliceous earth in the presence of sufficient water to effect hydration of the lime, and then grinding the resulting mixture in the presence of an amount of water sufficient to insure the presence of free moisture throughout the mixing operation, and, while mixing, maintaining the mixture at a temperature of about 100° C. or more to produce mutual reactions between the lime and the siliceous components of the mixture, and continuing said grinding treatment until the mixture has been reduced to a state of subdivision of approximately 90% through a 200-mesh screen or finer and until the lime and siliceous components have been brought into chemical combinations such that the product will show the hydrating and setting properties characteristic of a hydraulic cement.

29. The process of producing a cementitious product which comprises mixing air slaked lime and tripoli in the presence of sufficient water to insure hydration of the unslaked portions of said lime, and then grinding the resulting mixture in the presence of a limited amount of water while maintaining a temperature sufficient to produce mutual reactions between the lime and the siliceous components of the mixture, and continuing said grinding treatment until the mixture has been reduced to a state of subdivision of approximately 90% through a 200-mesh screen or finer and until the lime and siliceous components have been brought into chemical combinations such that the product will show the hydrating and setting properties characteristic of a hydraulic cement.

30. The process of producing a cementitious product which comprises mixing lime in a form reactive to silica and alumina with a siliceous earth previously reduced to a fineness of approximately 90% through a 200-mesh screen or finer, and with Portland cement, in the presence of an amount of water sufficient to insure hydration of any quick lime present and sufficient to insure the presence of free moisture in the mixture throughout the mixing operation, and, while mixing, maintaining the mixture at a temperature of at least 100° C., thereby effecting chemical combinations between the lime and silica components of the mixture.

31. The process of producing a cementitious product which comprises grinding lime in a form reactive to silica and alumina with diatomaceous earth, and with Portland cement, in the presence of a limited amount of water while maintaining the mixture at a temperature of at least 100° C., thereby effecting chemical combinations between the lime and the siliceous components of the mixture.

32. The process of producing a cementitious product which comprises grinding lime in a form reactive to silica and alumina with tripoli, and with Portland cement, in the presence of a limited amount of water while maintaining the mixture at a temperature of at least 100° C., thereby effecting chemical combinations between the lime and the siliceous components of the mixture.

In testimony whereof, I have signed my name to this specification this 19th day of November 1932.

ALTON J. BLANK.